(12) United States Patent
Lee

(10) Patent No.: US 6,653,888 B2
(45) Date of Patent: Nov. 25, 2003

(54) INTERNAL POWER VOLTAGE GENERATOR OF SEMICONDUCTOR DEVICE

(75) Inventor: Joo Sang Lee, Seoul (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 10/043,999

(22) Filed: Oct. 23, 2001

(65) Prior Publication Data

US 2002/0063594 A1 May 30, 2002

(30) Foreign Application Priority Data

Oct. 24, 2000 (KR) ........................................ 2000-62588

(51) Int. Cl.[7] .............................................. G05F 3/02
(52) U.S. Cl. ...................................... 327/534; 365/229
(58) Field of Search ................................ 327/534, 535; 307/110; 365/226, 227, 228, 229

(56) References Cited

U.S. PATENT DOCUMENTS

| | | | | |
|---|---|---|---|---|
| 5,396,114 A | * | 3/1995 | Lee et al. ..................... | 323/313 |
| 5,546,044 A | * | 8/1996 | Calligaro et al. ........... | 327/535 |
| 5,635,776 A | * | 6/1997 | Imi ............................. | 307/110 |
| 5,831,844 A | * | 11/1998 | Sudo ........................ | 307/110 |
| 5,877,651 A | * | 3/1999 | Furutani ..................... | 327/538 |
| 5,926,427 A | * | 7/1999 | Kim ............................ | 365/206 |
| 5,982,222 A | * | 11/1999 | Kyung ........................ | 327/536 |
| 6,031,411 A | * | 2/2000 | Tsay et al. .................... | 327/534 |
| 6,195,306 B1 | * | 2/2001 | Horiguchi et al. .......... | 365/226 |
| 6,198,342 B1 | * | 3/2001 | Kawai ........................ | 327/534 |
| 6,285,622 B1 | * | 9/2001 | Haraguchi et al. .......... | 365/226 |
| 6,337,595 B1 | * | 1/2002 | Hsu et al. .................... | 327/538 |
| 6,356,499 B1 | * | 3/2002 | Banba et al. ................ | 327/536 |
| 6,414,881 B1 | * | 7/2002 | Fujii et al. ............. | 365/189.09 |

* cited by examiner

Primary Examiner—Terry D. Cunningham
(74) Attorney, Agent, or Firm—Ladas & Parry

(57) ABSTRACT

The present invention discloses an internal power voltage generator of a semiconductor device which can actively control standby tape pumps and active tape pumps according to a magnitude of an internal power voltage. The internal power voltage generator of the semiconductor device include: an internal power voltage generating unit composed of a base voltage generating unit having a plurality of base voltage pumps, and generating an internal base voltage from an external power voltage according to a first control signal, and a high voltage generating unit having a plurality of high voltage pumps, and generating an internal high voltage from the external power voltage according to a second control signal; and a control unit for generating the first control signal for controlling a number of the pumps of the base voltage generating unit and the second control signal for controlling a number of the pumps of the high voltage generating unit according to a magnitude of an internal power voltage consumed in the operation of the semiconductor device.

1 Claim, 2 Drawing Sheets

INTERNAL POWER VOLTAGE GENERATOR OF SEMICONDUCTOR DEVICE

BACKGROUND OF THE INVENTION

1. Field of the Invention

The present invention relates to an internal power voltage generator of a semiconductor device, and in particular to an improved internal power voltage generator of a semiconductor device which can actively control standby tape pumps and active tape pumps according to a magnitude of an internal power voltage.

2. Description of the Background Art

In general, an internal power voltage generator is a circuit for generating an internal power voltage used in a semiconductor device. A conventional internal power voltage generator includes standby tape pumps operated when power is supplied, and active tape pumps operated when the internal power voltage is used in a large volume. The operation and disadvantages of the conventional internal power voltage generator will now be described with reference to the accompanying drawings.

FIG. 1 is a block diagram illustrating the conventional internal power voltage generator including a base voltage generating unit 12 having i standby tape pump units 12_i and j active tape pump units 13_j, and a high voltage generating unit 14 having k standby tape pump units 14_k and n active tape pump units 15_n.

The standby tape pump units 12_i of the base voltage generating unit 12 are operated when an external power voltage Vext is received, and the active tape pump units 13_j thereof are operated when an internal power voltage Vint is used in a large volume.

In the same manner, the standby tape pump units 14_k of the high voltage generating unit 14 are operated when an external power voltage Vcc_ext is received, and the active tape pump units 15_n thereof are operated when an internal power voltage Vcc-int is used in a large volume.

For example, the standby tape pumps are operated in a power down mode using a small amount of internal power voltage, and the standby tape pumps and the active tape pumps are all operated in a normal operation. In the case of the DRAM, the active tape pumps are operated in a row operation.

However, the conventional internal power voltage generator has a disadvantage in than a number of the standby tape pumps and a number of the active tape pumps are decided by simulation before fabrication of the semiconductor device. Accordingly, when a defect is generated after finishing the fabrication of the semiconductor device, it is impossible to adjust the numbers of the standby tape pumps and the active tape pumps.

That is, since the numbers of the standby tape pumps and the active tape pumps are fixed before fabricating the semiconductor device, if the internal power voltage proves to be different from a presumed value or variations are made due to an external environment after the fabrication of the semiconductor device, the numbers of the standby tape pumps and the active tape pumps cannot be controlled.

SUMMARY OF THE INVENTION

Therefore, it is an object of the present invention to provide an internal power voltage generator of a semiconductor device which can actively control standby tape pumps and active tape pumps according to a magnitude of an internal power voltage.

In order to achieve the above-described object of the present invention, there is provided an internal power voltage generator of a semiconductor device including: an internal power voltage generating unit composed of a base voltage generating unit having a plurality of base voltage pumps, and generating an internal base voltage from an external power voltage according to a first control signal, and a high voltage generating unit having a plurality of high voltage pumps, and generating an internal high voltage from the external power voltage according to a second control signal; and a control unit for generating the first control signal for controlling a number of the pumps of the base voltage generating unit and the second control signal for controlling a number of the pumps of the high voltage generating unit according to a magnitude of an internal power voltage consumed in the operation of the semiconductor device.

The control unit includes: a detecting unit for generating a signal detecting the magnitude of the internal power voltage in the operation of the semiconductor device; a register unit for storing a data value for adjusting the number of the pumps according to the output signal from the detecting unit; and a pump control unit for receiving the output signal from the register unit, and generating the first and second control signals.

In addition, the control unit further includes a data increasing/decreasing unit for increasing or decreasing a value to be stored in the register unit according to the output signal from the detecting unit.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
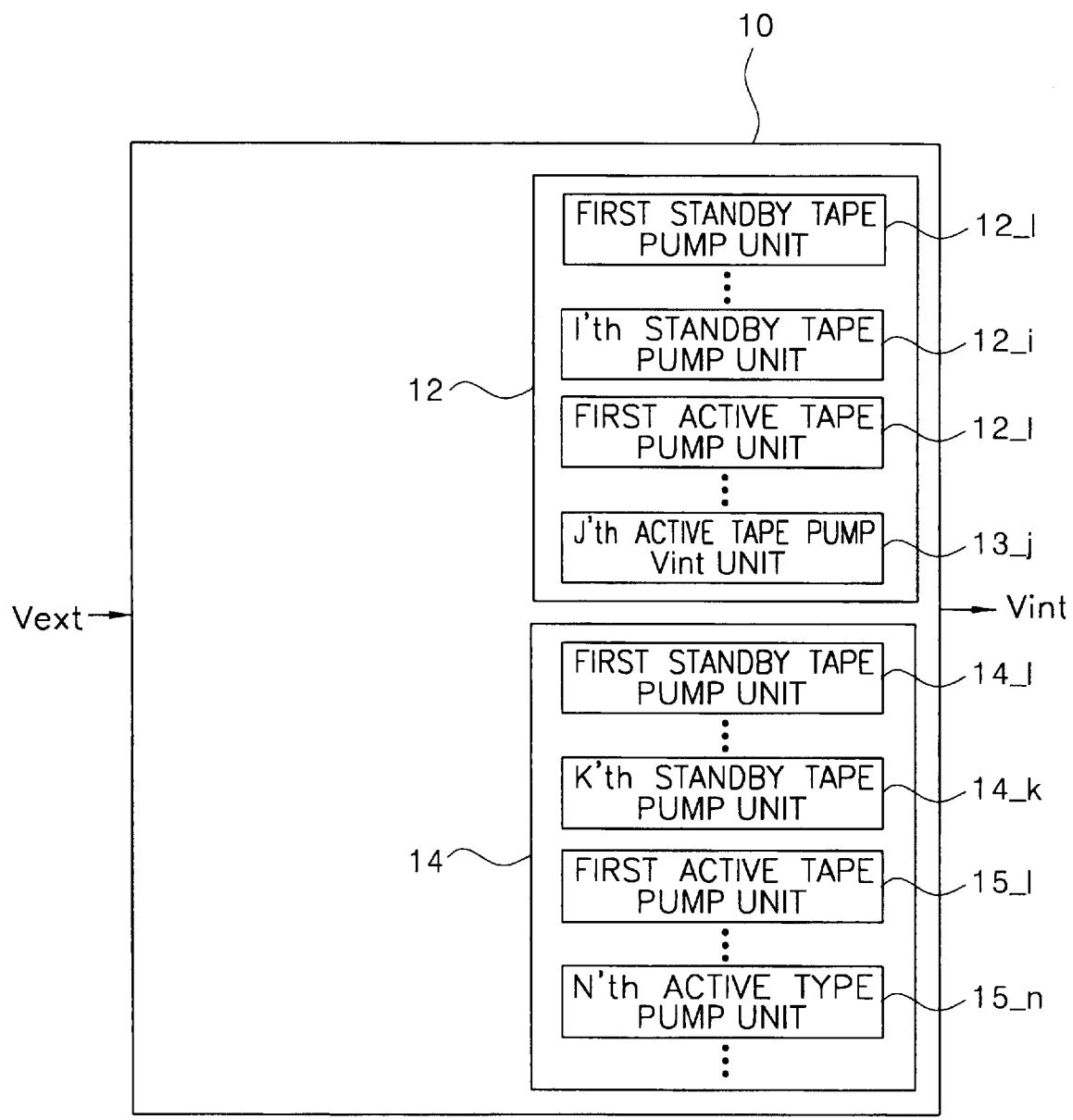
FIG. 1 is a block diagram illustrating a conventional internal power voltage generator.

An internal power voltage generator of a semiconductor device and a control circuit therefor in accordance with a preferred embodiment of the present invention will now be described in detail with reference to the accompanying drawings.

In the following description, same drawing reference numerals are used for the same elements even in different drawings, but detailed explanations thereof are omitted.

Figure 2:
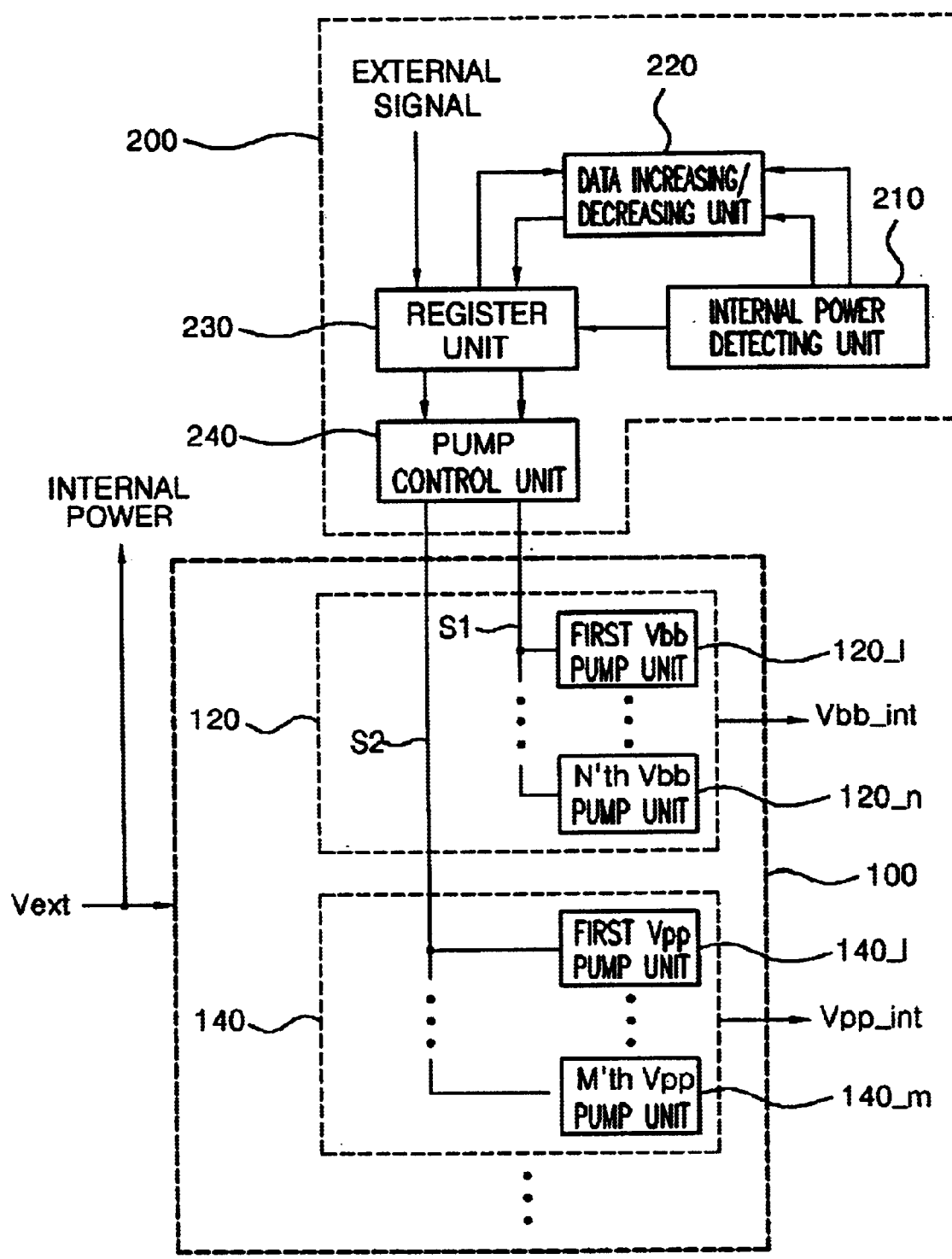
FIG. 2 is a block diagram illustrating an internal power voltage generator in accordance with the present invention.

FIG. 2 is a block diagram illustrating the internal power voltage generator in accordance with the present invention, including an internal power voltage generating unit 100 and a control unit 200.

The internal power voltage generating unit 100 is composed of a base voltage generating unit 120 receiving an external power voltage Vext, and generating an internal base voltage Vbb according to a control signal S1, and a high voltage generating unit 140 receiving the external power voltage Vext, and generating an internal high voltage Vpp according to a control signal S2.

The base voltage generating unit 120 includes n base voltage pump units 120_n for receiving the external power voltage Vext, and generating an internal base voltage Vbb_int according to the control signal S1 from a pump control unit 240.

The high voltage generating unit 140 includes m high voltage pump units 140_m for receiving the external power voltage Vext, and generating an internal high voltage Vpp_int according to the control signal S2 from the pump control unit 240.

The base voltage generating unit 120 and the high voltage generating unit 140 include a plurality of pumps, instead of individually including standby tape pumps and active tape pumps shown in FIG. 1.

The base voltage pump units 120_n of the base voltage generating unit 120 are controlled according to the output signal S1 from the pump control unit 240 of the control unit 200, thereby varying a number of the pumps operated. The high voltage pump units 140_n of the high voltage generating unit 140 are controlled according to the output signal S2 from the pump control unit 240 of the control unit 200, thereby varying a number of the pumps operated.

The control unit 200 includes an internal power voltage detecting unit 210, a data increasing/decreasing unit 220, a register unit 230 and the pump control unit 240.

When the semiconductor device remains in a power down mode, performs a row operation or accesses a bank, if a using amount of the internal power voltage is varied, the internal power voltage detecting unit 210 generates a detecting signal.

The register unit 230 stores a data value for adjusting the numbers of the standby tape pumps and the active tape pumps. Here, the values stored in the register unit 230 may be inputted from the outside of the semiconductor device (in an initial stage), or adjusted in a circuit for detecting a specific state such as a power down mode or row operation.

The data increasing/decreasing unit 220 increases or decreases a value to be stored in the register unit 230 according to the output signal from the internal power voltage detecting unit 210.

The pump control unit 240 receives the output signal from the register unit 230, and generates the control signal S1 for adjusting the number of the pumps of the base voltage generating unit 120 of the internal power voltage generating unit 100, and the control signal S2 for adjusting the number of the pumps of the high voltage generating unit 140 thereof.

A general gate or PLA may be embodied as the pump control unit 240. Here, the pump control unit 240 receives a register value, and enables the pump to be operated.

Therefore, the internal power detecting unit 210 detects a magnitude of the internal power, and the register unit 230 stores the resulting value. According to the value stored in the register unit 230, the pump control unit 240 controls the numbers of the pumps of the base voltage generating unit 120 and the high voltage generating unit 140, as a result it is possible to adjust the number of the pumps so that the internal power voltage can be generated pursuant to the operation state of the semiconductor device.

In another embodiment of the present invention, the pump control unit 240 of FIG. 2 can be removed. Here, bits of the register unit 230 control the respective pumps.

In addition, in yet another embodiment of the present invention, the data increasing/decreasing unit 220 of FIG. 2 can be removed. Here, the internal power voltage detecting unit 210 directly controls the register value.

The internal power voltage detecting unit 210 can be used in a semiconductor memory device field as well as a non-memory device field.

As discussed earlier, in accordance with the present invention, the internal power voltage detecting unit 210 of the semiconductor device detect the operation mode of the semiconductor device, and selectively control the number of the pumps generating the internal power voltage according to the operation mode. It is thus not required to decide the numbers of the active tape pumps and the standby tape pumps in an initial design work.

When fabrication of the semiconductor device is finished, if a presumed number of the pumps has a problem, the number of the pumps can be controlled by adjusting the register value.

Moreover, although semiconductor elements have variations, the user can operate an optimal number of pumps by adjusting the register value.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are intended to be embraced by the appended claims. The above-described embodiment of the present invention relates mostly to the sense amplifier layout method of the semiconductor memory device, but the semiconductor memory device using the same is also included in the scope of the present invention.

What is claimed is:

1. An internal power voltage generator of a semiconductor device operating in an operation mode including a standby mode or an active mode, the internal power voltage generator comprising:

an internal power voltage generating unit comprising a base voltage generating unit and a high voltage generating unit,
wherein the base voltage generating unit has a plurality of base voltage pumps and is capable of generating an internal base voltage in either one or both of the standby mode and the active mode from an external power voltage according to a first control signal, and
further wherein the high voltage generating unit has a plurality of high voltage pumps and is capable of generating an internal high voltage from the external power voltage according to a second control signal; and a control unit for generating the first control signal for controlling a number of the base voltage pumps of the base voltage generating unit and for generating the second control signal for controlling a number of the high voltage pumps of the high voltage generating unit, the control unit comprising:

an internal power detecting unit for generating a signal based on the detected magnitude of the internal power of the semiconductor device reflecting the operation mode;
a register for storing a data value for adjusting the number of the pumps according to the signal generated by the internal power detecting unit; and
a pump control unit for generating the first control signal and the second control signal based at least on the data value of the register,
wherein the number of the plurality of base voltage pumps being operated by the first control signal and the number of the plurality of high voltage pumps being operated by the second control signal are dependent on the operation mode of the semiconductor device.

* * * * *